US012777497B2

(12) United States Patent
Tang et al.

(10) Patent No.: US 12,777,497 B2
(45) Date of Patent: Oct. 27, 2026

(54) METHODS AND APPARATUS OF TWO STAGE DOWNLINK CONTROL INFORMATION

(71) Applicant: HUAWEI TECHNOLOGIES CO., LTD., Shenzhen (CN)

(72) Inventors: Hao Tang, Shenzhen (CN); Jianglei Ma, Kanata (CA); Xiaoyan Bi, Shenzhen (CN); Peiying Zhu, Kanata (CA); Wen Tong, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 18/331,290

(22) Filed: Jun. 8, 2023

(65) Prior Publication Data

US 2023/0389044 A1 Nov. 30, 2023

Related U.S. Application Data

(63) Continuation of application No. PCT/CN2020/139128, filed on Dec. 24, 2020.

(51) Int. Cl.
*H04W 72/232* (2023.01)
*H04W 72/1273* (2023.01)

(52) U.S. Cl.
CPC ..... *H04W 72/232* (2023.01); *H04W 72/1273* (2013.01)

(58) Field of Classification Search
None
See application file for complete search history.

(56) References Cited

U.S. PATENT DOCUMENTS 10,834,664 B2 11/2020 Wang et al.
2018/0019843 A1* 1/2018 Papasakellariou .... H04W 72/20
2018/0124753 A1* 5/2018 Sun .......................... H04L 1/0088
2019/0261256 A1 8/2019 Wang et al.
2020/0022175 A1* 1/2020 Xiong ..................... H04L 5/001
(Continued)

FOREIGN PATENT DOCUMENTS

CN 101932024 A 12/2010
CN 102573094 A 7/2012
(Continued)

OTHER PUBLICATIONS

"Physical channels and modulation", 33rd Generation Partnership Project; Technical Specification Group Radio Access Network; NR; (Release 15), 3GPP TS 38.211 V15.8.0; Dec. 2019, 97 pages.
(Continued)

*Primary Examiner* — Srinivasa R Reddivalam
(74) *Attorney, Agent, or Firm* — Slater Matsil, LLP

(57) ABSTRACT

Methods for transmitting and receiving downlink control information (DCI) are provided along with corresponding network devices and apparatus. A first stage DCI is transmitted that explicitly indicates a scheduling information of a second stage DCI. The second stage DCI is transmitted in a first physical downlink shared channel (PDSCH), consistent with the scheduling information. The first PDSCH is a physical channel without data transmission. The receiving
(Continued)

apparatus does not need to perform blind decoding of the second stage DCI because it is aware of its location from the scheduling information.

20 Claims, 12 Drawing Sheets

(56) References Cited

U.S. PATENT DOCUMENTS

2023/0232407 A1* 7/2023 Yuan .................... H04L 1/0038
370/329

FOREIGN PATENT DOCUMENTS

WO 2018054373 A1 3/2018
WO 2018175820 A1 9/2018

OTHER PUBLICATIONS

"Physical channels and modulation", 3rd Generation Partnership Project; Technical Specification Group Radio Access Network; NR; (Release 16), 3GPP TS 38.211 V16.2.0, Jun. 2020, 131 pages.
"Multiplexing and channel coding", 3rd Generation Partnership Project; Technical Specification Group Radio Access Network; NR; (Release 15), 3GPP TS 38.212 V15.8.0, Dec. 2019, 101 pages.
"Multiplexing and channel coding", 3rd Generation Partnership Project; Technical Specification Group Radio Access Network; NR; (Release 16), 3GPP TS 38.212 V16.2.0, Jun. 2020, 151 pages.
"Physical layer procedures for control", 3rd Generation Partnership Project; Technical Specification Group Radio Access Network; NR; (Release 15), 3GPP TS 38.213 V15.8.0, Dec. 2019, 109 pages.
"Physical layer procedures for control ", 3rd Generation Partnership Project; Technical Specification Group Radio Access Network; NR; (Release 16), 3GPP TS 38.213 V16.2.0, Jun. 2020, 176 pages.
"Physical layer procedures for data", 3rd Generation Partnership Project; Technical Specification Group Radio Access Network; NR; (Release 15), 3GPP TS 38.214 V15.8.0, Dec. 2019, 106 pages.
"Physical layer procedures for data", 3rd Generation Partnership Project; Technical Specification Group Radio Access Network; NR; (Release 16), 3GPP TS 38.214 V16.2.0, Jun. 2020, 163 pages.
"Radio Resource Control (RRC) protocol specification", 3rd Generation Partnership Project; Technical Specification Group Radio Access Network; NR; (Release 15), 3GPP TS 38.331 V15.8.0, Dec. 2019, 532 pages.
"Radio Resource Control (RRC) protocol specification", 3rd Generation Partnership Project; Technical Specification Group Radio Access Network; NR; (Release 16), 3GPP TS 38.331 V16.2.0, Sep. 2020, 921 pages.
MEDIATEK INC:"On Multi-cell PDSCH Scheduling via Single DCI," 3GPP Draft; R1-2008963;Nov. 1, 2020, Total:8Pages.
AT&T, "Two Stage DCI Design for NR DL Control Channel," 3GPP TSG RAN WG1 Meeting #88, R1-1702274, Athens, Greece, Feb. 13-17, 2017, 6 pages.

* cited by examiner

METHODS AND APPARATUS OF TWO STAGE DOWNLINK CONTROL INFORMATION

CROSS-REFERENCE TO RELATED APPLICATION

This application is a continuation of International Application No. PCT/CN2020/139128, filed on Dec. 24, 2020, which is hereby incorporated by reference in its entirety.

FIELD

The application relates to wireless communications generally, and more specific to methods and apparatus for transmitting and receiving downlink control information (DCI).

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources, typically referred to as "time-frequency resources".

Two devices that wirelessly communicate with each other over time-frequency resources need not necessarily be a UE and a base station. For example, two UEs may wirelessly communicate with each other over a sidelink using device-to-device (D2D) communication. As another example, two network devices (e.g. a terrestrial base station and a non-terrestrial base station, such as a drone) may wirelessly communicate with each other over a backhaul link. When devices wirelessly communicate with each other, the wireless communication may be performed control information transmission which is dynamically indicated to the UE, e.g. in the physical layer in a control channel. An example of control information that is dynamically indicated is information sent in physical layer control signaling, e.g. downlink control information (DCI).

In 3GPP New Radio (NR) Release-15, there are 8 DCI formats as shown in Table 1 below. For each DCI format, a user equipment (UE) needs to know the DCI size, and performs DCI detection using blind decoding. A large number of DCI formats and DCI sizes will increase the UE implementation complexity. For example, a UE needs to perform DCI size alignment for these DCI formats. In NR, the total number of different DCI sizes configured to monitor is no more than 4 for a cell, and the total number of different DCI sizes with Cell-Radio Network Temporary Identifier (C-RNTI) is no more than 3.

TABLE 1

DCI formats

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In addition, when introducing new features in 3GPP NR Release 16, new DCI formats are introduced, e.g. DCI format 0_2 and 1_2 for ultra reliable low latency communications (URLLC) scheduling, which further increases the complexity of UE blind decoding. Furthermore, for carrier aggregation (CA) and dual connectivity (DC), the number of blind decodings for the UE to perform is increased with the number of active carriers.

SUMMARY

According to one aspect of the present disclosure, there is provided a method in an apparatus for receiving downlink control information (DCI), the method comprising: receiving, by the apparatus, a first stage DCI in a physical downlink control channel (PDCCH); decoding, by the apparatus, the first stage DCI in physical downlink control channel (PDCCH), the first stage DCI explicitly indicating a scheduling information of a second stage DCI; receiving, by the apparatus, the second stage DCI in a first physical downlink shared channel (PDSCH); decoding, by the apparatus, the second stage DCI in the first PDSCH; wherein the first PDSCH is a physical channel without data transmission.

According to another aspect of the present disclosure, there is provided a method in a network element for transmitting downlink control information (DCI), the method comprising: transmitting, by the network element, a first stage DCI in a physical downlink control channel (PDCCH), the first stage DCI explicitly indicating a scheduling information of a second stage DCI; transmitting, by the network element, the second stage DCI in a first physical downlink shared channel (PDSCH); wherein the first PDSCH is a physical channel without data transmission.

According to another aspect of the present disclosure, there is provided an apparatus comprising at least one processor; and a computer readable storage medium operatively coupled to the at least one processor, the computer readable storage medium storing programming for execution by the at least one processor, the programming comprising instructions to receive downlink control information (DCI), receive a first stage DCI in a physical downlink control channel (PDCCH); decode the first stage DCI in physical downlink control channel (PDCCH), the first stage DCI explicitly indicating a scheduling information of a second stage DCI; receive the second stage DCI in a first physical downlink shared channel (PDSCH); decode the second stage DCI in the first PDSCH; wherein the first PDSCH is a physical channel without data transmission.

According to another aspect of the present disclosure, there is provided a network element comprising: at least one processor; and a computer readable storage medium operatively coupled to the at least one processor, the computer readable storage medium storing programming for execution by the at least one processor, the programming comprising instructions to transmit a first stage DCI in a physical downlink control channel (PDCCH), the first stage DCI explicitly indicating a scheduling information of a second stage DCI; transmit the second stage DCI in a first physical downlink shared channel (PDSCH); wherein the first PDSCH is a physical channel without data transmission.

Based on above embodiments, advantages of above new two stage DCI framework includes the first stage DCI explicitly indicating a scheduling information of a second stage DCI, thus only blind decoding for the first stage DCI, and blind detection is not needed for the second stage DCI, thus reduce the number of blind decoding.

According to one aspect of the present disclosure, the scheduling information of the second stage DCI may comprise parameters of at least one of a time domain resource, a frequency domain resource, a spatial domain resource of the second stage DCI. In another aspect, the first stage DCI further indicates at least one of the following modulation order, coding rate, and partial or full scheduling information for a data channel transmission of the second stage DCI. Thus, the 2nd stage DCI can have flexible DCI size to enable more flexible scheduling. Furthermore, the new two-stage DCI framework can provide a minimized size for first stage DCI, as a large portion can be included in the control information is in the second stage DCI, thus not only can achieve forward compatibility (limited/fixed size of first stage DCI), but also can achieve more flexible DCI size the first stage DCI and the second stage DCI based on different requirement.

Based on above embodiments, the second stage DCI is carried in the first PDSCH without data transmission, and has flexible contents due to flexible transport block size (transport block size may be determined by available resource elements, coding rate, modulation order indicated by first stage DCI).

The second stage DCI may be used to enable flexible AI indication. This can include a flexible indication AI signaling field, including whether the field is present or not.

In some embodiments, the second stage DCI indicates at least one of the following: scheduling information for one PDSCH; scheduling information for multiple PDSCH scheduling information for one PUSCH; scheduling information for multiple PUSCH; scheduling information for one PDSCH and one PUSCH; scheduling information for one PDSCH and multiple PUSCH; scheduling information for multiple PDSCH and one PUSCH; scheduling information for multiple PDSCH and multiple PDSCH; scheduling information for sidelink; partial scheduling information for at least one PUSCH and/or at least one PDSCH, wherein the partial scheduling information is an update to scheduling information in the first stage DCI; partial scheduling information for at least one PUSCH and/or at least one PDSCH, wherein remaining scheduling information for the at least one PUSCH and/or at least one PDSCH is included in the first stage DCI; configuration information related to an artificial intelligence (AI)/machine learning (ML) function; and configuration information related to a non-AI/ML function.

In some embodiments, the apparatus received the first stage DCI and the second stage DCI in time division multiplexed or frequency division multiplexed or time division multiplexed and frequency division multiplexed.

In some embodiments, the method further comprises: receiving downlink data using PDSCH resources indicated by scheduling information in the second stage DCI; wherein the scheduling information indicated in the first stage DCI comprises values from a first set of values for scheduling parameters, the scheduling information in the second stage DCI comprises values from a second set of values for scheduling parameters, and the first set of values and the second set of values is separately predefined or configured for indicating one or more of: whether retransmission is enabled; inclusion of retransmission related parameters; modulation order options; coding rate options; options for number of transport blocks; options for number of MIMO layers; options for time/frequency domain resource allocation types, and/or locations.

Advantageously, with these embodiments, for PDSCH carrying second stage DCI and PDSCH carrying downlink data, the available values of scheduling parameter(s) for scheduling these two PDSCH may be separately predefined or configured by a BS, ensuring the reliability of the second stage DCI and reducing the scheduling overhead in the first stage DCI.

In some embodiments, the first stage DCI and the second stage DCI are received in a first carrier; or the first stage DCI is received in a first carrier and the second stage DCI is received in a second carrier different from the first carrier.

In some embodiments, the second stage DCI comprises scheduling information for multiple carriers.

In some embodiments, the second stage DCI comprises: an indication of whether there is scheduling information for each of N carriers; scheduling information for each of N carriers when the indication indicates there is scheduling information for each of N carriers; where N≥2.

According to another aspect of the present disclosure, there is provided an apparatus comprising: a processor and a memory; the apparatus configured to implement the method described above.

According to another aspect of the present disclosure, there is provided a network element comprising: a processor and a memory; the apparatus configured to implement the method described above.

BRIEF DESCRIPTION OF THE DRAWINGS

Embodiments of the disclosure will now be described with reference to the attached drawings in which.

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

In future networks, such as 6G, it is expected more UE requirements and more UE capabilities will be introduced, for example, an extreme power saving requirement, and UEs with and without artificial intelligence (AI). As a consequence, if the same design principle of 5G NR is followed for DCI, there will be a significant number of DCI formats/sizes in 6G, which will lead to a significant burden on the UEs in performing blind decoding. The introduction of new DCI formats is complicated by DCI size alignments and may not be forward compatible. In addition, the number of blind decodings for the UE to perform is increased with the number of active carriers. Therefore, it would be advantageous to be able to reduce the number of blind decodings that the UEs need to perform.

Figure 1:
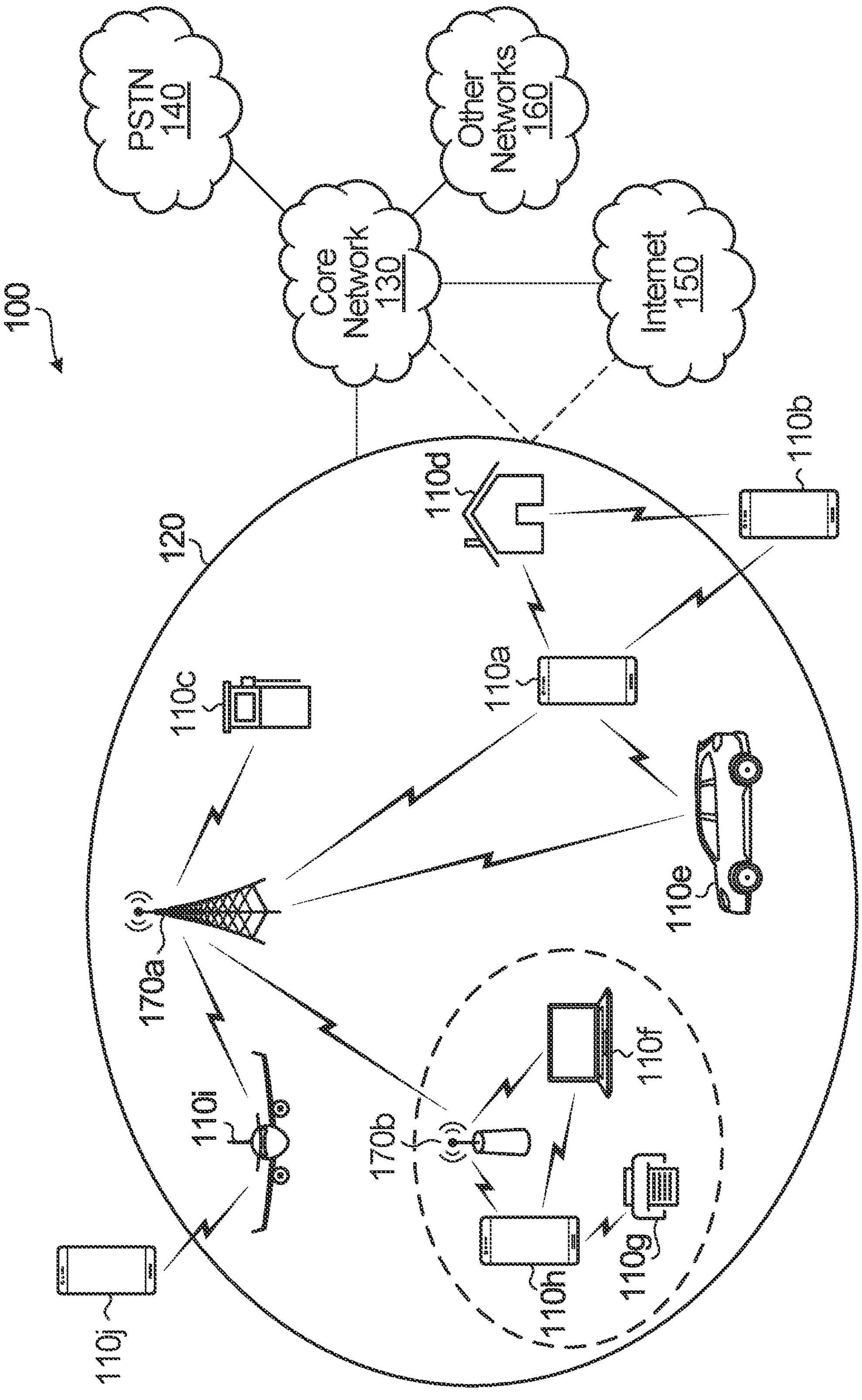
FIG. 1 is a block diagram of a communication system.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110*a*-120*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
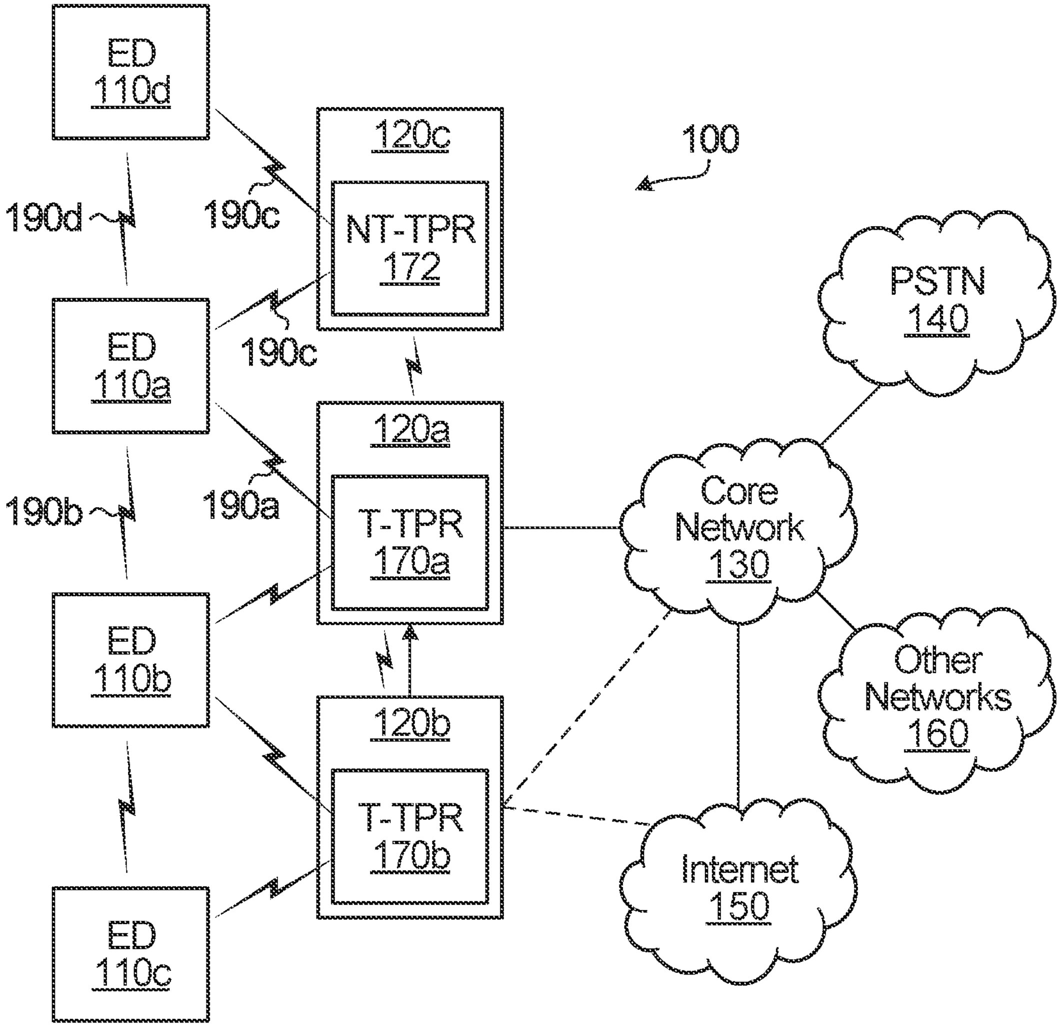
FIG. 2 is a block diagram of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110*a*-110*d* (generically referred to as ED 110), radio access networks (RANs) 120*a*-120*b*, non-terrestrial communication network 120*c*, a core network 130, a public switched telephone network (PSTN) 140, the internet 150, and other networks 160. The RANs 120*a*-120*b* include respective base stations (BSs) 170*a*-170*b*, which may be generically referred to as terrestrial transmit and receive points (T-TRPs) 170*a*-170*b*. The non-terrestrial communication network 120*c* includes an access node 120*c*, which may be generically referred to as a non-terrestrial transmit and receive point (NT-TRP) 172.

Any ED 110 may be alternatively or additionally configured to interface, access, or communicate with any other T-TRP 170*a*-170*b* and NT-TRP 172, the internet 150, the core network 130, the PSTN 140, the other networks 160, or any combination of the preceding. In some examples, ED 110*a* may communicate an uplink and/or downlink transmission over an interface 190*a* with T-TRP 170*a*. In some examples, the EDs 110*a*, 110*b* and 110*d* may also communicate directly with one another via one or more sidelink air interfaces 190*b*. In some examples, ED 110*d* may communicate an uplink and/or downlink transmission over an interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the Internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such.

Figure 3:
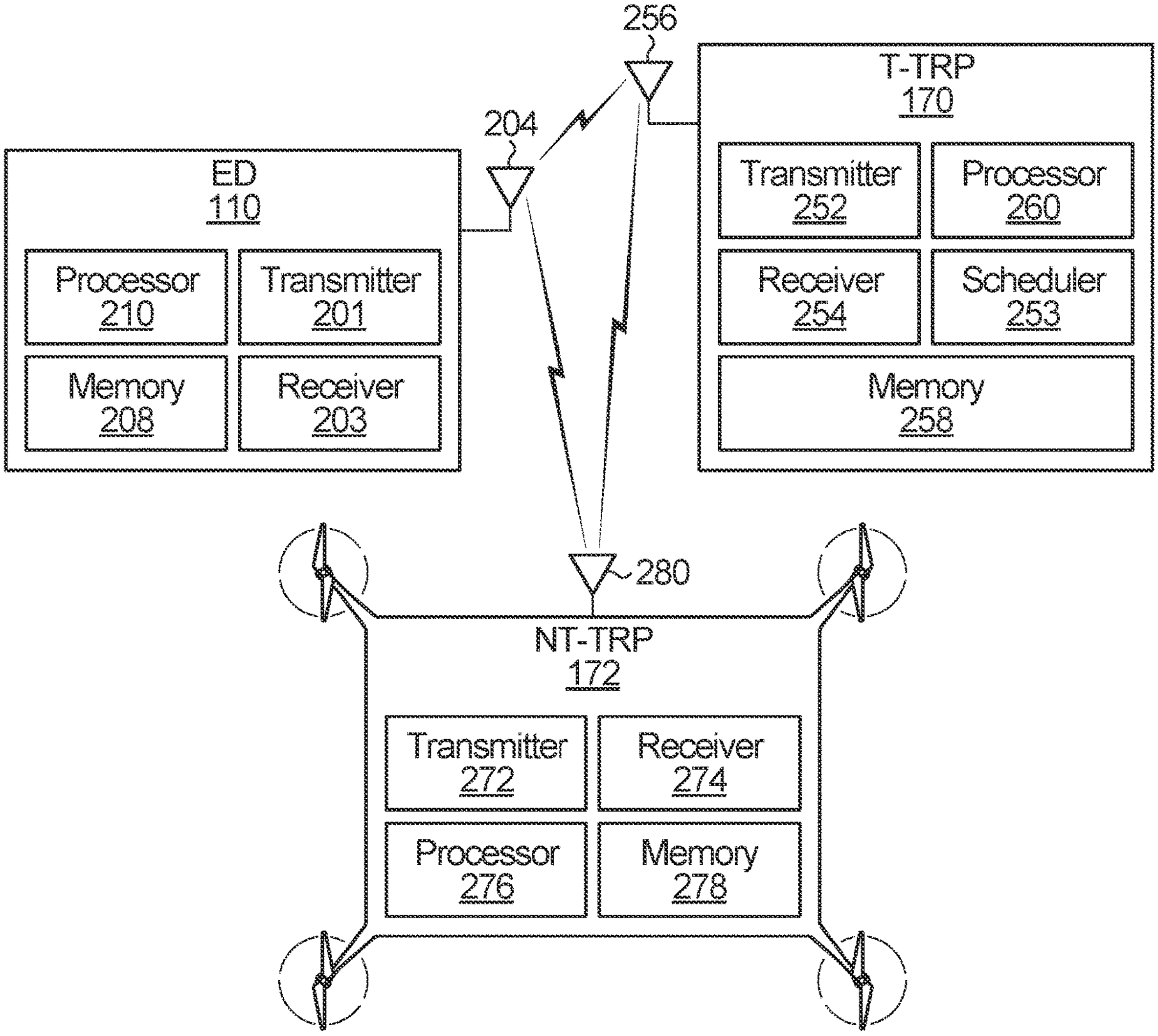
FIG. 3 is a block diagram of a communication system showing a basic component structure of an electronic device (ED) and a base station.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
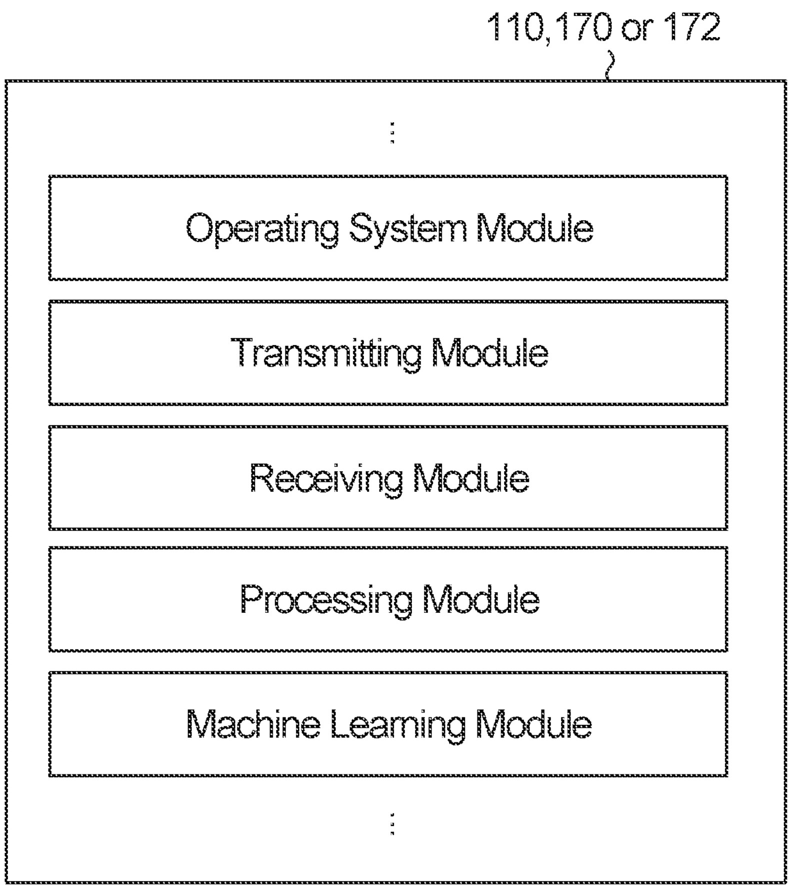
FIG. 4 is a block diagram of modules that may be used to implement or perform one or more of the steps of embodiments of the application.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Cell/Carrier/Bandwidth Parts (BWPs)/Occupied Bandwidth

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g. a carrier may have a bandwidth of 20 MHz and consist of one BWP, or a carrier may have a bandwidth of 80 MHz and consist of two adjacent contiguous BWPs, etc. In other embodiments, a BWP may have one or more carriers, e.g. a BWP may have a bandwidth of 40 MHz and consists of two adjacent contiguous carriers, where each carrier has a bandwidth of 20 MHz. In some embodiments, a BWP may comprise non-contiguous spectrum resources which consists of non-contiguous multiple carriers, where the first carrier of the non-contiguous multiple carriers may be in mmW band, the second carrier may be in a low band (such as 2 GHz band), the third carrier (if it exists) may be in THz band, and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage $\beta/2$ of the total mean transmitted power, for example, the value of $\beta/2$ is taken as 0.5%.

The carrier, the BWP, or the occupied bandwidth may be signaled by a network device (e.g. base station) dynamically, e.g. in physical layer control signaling such as DCI, or semi-statically, e.g. in radio resource control (RRC) signaling or in the medium access control (MAC) layer, or be predefined based on the application scenario; or be determined by the UE as a function of other parameters that are known by the UE, or may be fixed, e.g. by a standard.

Integrated Communications with Sensing, Artificial Intelligence (AI) and/or Machine Learning (ML)

Going to the future wireless network, the number of the new devices could be increased exponentially with diverse functionalities. Also, a lot more new applications and use cases than 5G may emerge with more diverse quality of service demands. These will result in new key performance indications (KPIs) for the future wireless network (for an example, 6G network) that can be extremely challenging, so the sensing technologies, and AI technologies, especially Ml (deep learning) technologies, had been introduced to telecommunication for improving the system performance and efficiency.

Artificial Intelligence (AI) and/or Machine Learning (ML)

AI/ML technologies applied communication including AI/ML communication in Physical layer and AI/ML communication in media access control (MAC) layer. For physical layer, the AI/ML communication to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and Sensing & positioning, etc. For MAC layer, AI/ML communication to utilize the AI/ML capability with learning, prediction and make decision to solve the complicate optimization problems with better strategy and optimal solution, for an example, to optimize the functionality in MAC, e.g. intelligent TRP management, intelligent beam management, intelligent channel resource allocation, intelligent power control, intelligent spectrum utilization, intelligent MCS, intelligent HARQ strategy, intelligent Tx/Rx mode adaption, etc.

AI/ML architectures usually involves multiple nodes, the multiple nodes can be organized in two modes, i.e., centralized and distributed, both of which can be deployed in access network, core network, or an edge computing system or third network. The centralized training and computing architecture is restricted by huge communication overhead and strict user data privacy. Distributed training and computing architecture comprises several framework, e.g., distributed machine learning and federated learning. AI/ML architectures comprises intelligent controller which can perform as single agent or multi-agent, based on joint optimization or individual optimization. New protocol and signaling mechanism is needed so that the corresponding interface link can be personalized with customized parameters to meet particular requirements while minimizing signaling overhead and maximizing the whole system spectrum efficiency by personalized AI technologies.

Sensing

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For an example, terrestrial networks based sensing and non-terrestrial networks based sensing will involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinator are nodes in a network that can assist in the sensing operation. These nodes can be stand-alone nodes dedicated to just sensing operations or other nodes (for example TRP 170, ED 110, or core network node) doing the sensing operations in parallel with communication transmissions. New protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHz, millimeter to Terahertz carrier frequency, from space, outdoor to indoor scenario, and from text, voice to video. These data are collecting, processing and usage are performed in a unified framework or a different framework.

Two-Stage DCI Framework

A DCI transports downlink control information for one or more cells/carriers/BWPs. DCI structure includes one stage DCI and two stage DCI. In one stage DCI structure, the DCI has a single part and is carried on a physical channel, e.g. PDCCH, a UE receives the physical channel and decodes the DCI in the physical channel, then receives or transmits data according to the control information in the DCI. For instance, in 3GPP TS 38.212v15.8.0, DCI formats 0_0, 0_1, 1_0, 1_1, 2_0, 2_1, 2_2 and 2_3 are one stage DCIs.

In a two stage DCI structure, the DCI structure includes two parts, i.e. first stage DCI and corresponding second stage DCI. The first stage DCI and the second stage DCI are transmitted in different physical channels, e.g. the first stage DCI is carried on a PDCCH and the second stage DCI is carried on a PDSCH, wherein the second stage DCI is not multiplexed with UE DL data, i.e. the second stage DCI is transmitted on a PDSCH without DL-SCH. The first stage DCI indicates control information for the second stage DCI, including time/frequency/spatial resources of the second stage DCI. Optionally, the first stage DCI can indicate the presence of the second stage DCI. If the second stage DCI is present, a UE needs to receive both the first stage and the second stage DCI to get the control information for data transmission. For the contents of the first stage DCI and second stage DCI, the first stage DCI includes the control information for the second stage DCI and the second stage DCI includes the control information for the UE data; or the first stage DCI includes the control information for the second stage DCI and partial control information for the UE data, and the second stage DCI includes partial or whole control information for the UE data. If the second stage DCI is not present, which may be indicated by the first stage DCI, a UE receives the first stage DCI to get the control information for data transmission.

In accordance with an embodiment of the application, a two stage DCI framework is provided. The two stage framework involves the use of a first stage DCI that is transmitted by the network device, for example by a base station, for reception by UE. The first stage DCI is carried by a physical downlink control channel (PDCCH). The two stage framework also involves the use of a second stage DCI that is transmitted by the network device for reception by UE. The second stage DCI is carried by a physical downlink shared channel (PDSCH) without data transmission, or the second stage DCI is carried in a specific physical channel (e.g. a specific downlink data channel, or a specific downlink control channel) only for the second stage DCI transmission.

The second stage DCI is transmitted on PDSCH without downlink shared channel (DL-SCH), where the DL-SCH is a transport channel used for the transmission of downlink data. That is to say the physical resources of the PDSCH used to transmit the second stage DCI are used for a transmission including the second stage DCI without multiplexing with other downlink data. For example, where the unit of transmission on the PDSCH is a physical resource block (PRB) in frequency-domain and a slot in time-domain, an entire resource block in a slot is available for second stage DCI transmission. This allows maximum flexibility in terms of the size of the second stage DCI, without the constraints on the amount of DCI that could be transmitted that would be introduced if multiplexing with downlink data was employed. This also avoids the complexity of rate matching for downlink data if the downlink data is multiplexed with DCI.

The UE receives the first stage DCI (for example by receiving a physical channel carrying the first stage DCI) and performs decoding (e.g. blind decoding) to decode the first stage DCI. Scheduling information for the second stage DCI, within the PDSCH, is explicitly indicated by the first stage DCI. The result is that the second stage DCI can be received and decoded by the UE without the need to perform blind decoding, based on the scheduling information in the first stage DCI.

As compared to scheduling a PDSCH carrying downlink data, in some embodiments more robust scheduling information is used to schedule a PDSCH carrying second stage DCI, increasing the likelihood of that the receiving UE can successfully decode the second stage DCI. Detailed examples are provided below.

Because the second stage DCI is not limited by constraints that may exist for PDCCH transmissions, the size of the second stage DCI is very flexible, and may be used to indicate scheduling information for one carrier, multiple carriers, multi-transmissions for one carrier. Detailed examples are provided below.

Figure 5A:
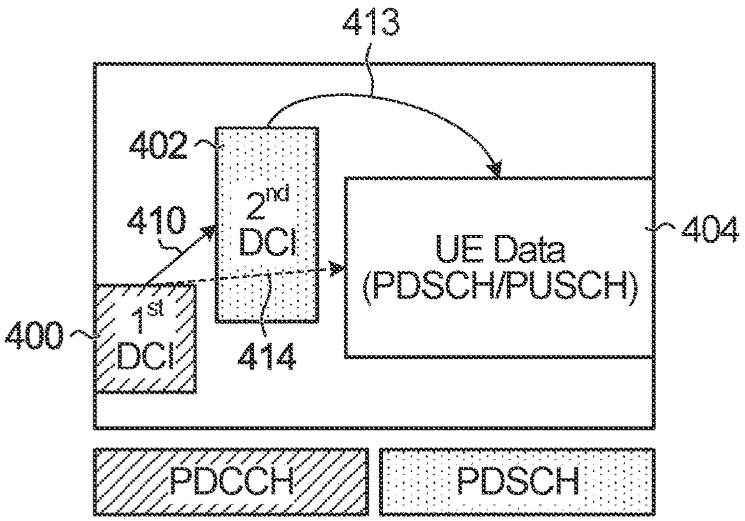
FIG. 5A shows time frequency resources for a two stage DCI.

An example of the resources that might be used for the two stage DCI is shown in FIG. 5A. In FIG. 5A, time domain (e.g, orthogonal frequency division multiplexing (OFDM) symbol durations) is in the horizontal axis, and frequency domain (e.g, OFDM subcarriers) is in the vertical direction. Shown is a first stage DCI 400 transmitted using a PDCCH, where the PDCCH includes one or more control channel elements (CCEs) or enhanced CCEs, and a second stage DCI 402 transmitted on a PDSCH using at least one of one or more PRBs, one or multiple transport block(s), and one or more symbols, the PDSCH uses for transmitting the second stage DCI 402 only without any UE data transmission. One example of PDCCH and PDSCH structure can refer to the following FIG. 6. The first stage DCI 400 includes a scheduling information of the second stage DCI 402, depicted graphically by arrow 410. Also shown is UE data 404, which may include uplink data on a physical uplink shared channel (PUSCH) and/or downlink data on a PDSCH and/or a sidelink channel scheduled by the second stage DCI.

In some embodiments, scheduling information of the second stage DCI indicates parameters of at least one of a time resource, a frequency resource and a spatial resource of the second stage DCI. The first stage DCI may also indicate at least modulation order of the second stage DCI, coding rate of the second stage DCI, partial or full scheduling information for a data transmission.

The second stage DCI may include scheduling information for data channel, e.g. PDSCH for DL scheduling and/or PUSCH for uplink (UL) scheduling. Referring to FIG. 5A, for this case, arrow 410 represents the indication of the time and/or frequency and/or spatial resources and/or modulation order and/or coding rate of the second stage DCI, and arrow 413 represents the scheduling information for data transmission, e.g. DL scheduling for PDSCH and/or UL scheduling for PUSCH and/or sidelink resources for UE transmission or reception In some embodiments, the first stage DCI indicates scheduling information of the second stage DCI, and also includes partial scheduling information for a data transmission, such as one or more of time/frequency/spatial resource allocation, modulation order, coding rate, HARQ information, UE feedback resources, or power control for data. The second stage DCI includes additional detailed scheduling information for data, e.g. the information not indicated by first stage DCI, or an update to the information indicated by first stage DCI for data. Referring to FIG. 5A, for this case, arrow 410 represents the indication of the time and/or frequency and/or spatial resources and/or modulation order and/or coding rate of the second stage DCI. Arrow 414 represents partial scheduling information for data transmission. Arrow 413 represents the detailed scheduling information for data, e.g. DL scheduling for PDSCH and/or UL scheduling for PUSCH.

The first stage DCI is blind decoded by the UE. No blind decoding is required for the second stage DCI because the scheduling information of the second stage DCI is explicitly indicated by the first stage DCI.

A transport block defines the basic information bits unit transmitted in PDSCH/PUSCH. For PDSCH carrying downlink data, e.g. information bits from MAC layer, a MAC protocol data unit (PDU) is mapped to a TB. For PDSCH carrying the second stage DCI, the DCI is mapped to a TB. The transport block size (TBS) is defined as the size (number of bits) of a TB. Depending on definition, the TB size may include or exclude the CRC bits. While no TB from a medium access control (MAC) layer is transmitted in the PDSCH carrying the second stage DCI, the size of the second stage DCI may be determined in a manner similar to how TB size for DL-SCH transmitted using the PDSCH is calculated/determined. The TB size may be calculated, for example, based on the available resource elements (REs) for PDSCH, modulation order, coding rate, the number of layers, etc. See for example, Section 5.1.3.2 of 3GPP TS 38.214 which includes a detailed breakdown of an example method of TB size calculation. Therefore, by assigning flexible RBs and symbols for the PDSCH, and using various coding rates for the DCI, the size of second stage DCI is very flexible, enabling DCI size to be specified differently for different uses, for example, different UEs, different services, different scenarios, etc, thus can achieve personalized DCI size requirements.

In some embodiments, the second stage DCI may indicate at least one of the following for scheduling data transmission for a UE:

- scheduling information for one PDSCH in one carrier/BWP;
- scheduling information for multiple PDSCH in one carrier/BWP;
- scheduling information for one PUSCH in one carrier/BWP;
- scheduling information for multiple PUSCH in one carrier/BWP;
- scheduling information for one PDSCH and one PUSCH in one carrier/BWP;
- scheduling information for sidelink in one carrier/BWP; carrier/BWP;
- scheduling information for one PDSCH and multiple PUSCH in one carrier/BWP;
- scheduling information for multiple PDSCH and one PUSCH in one carrier/BWP;
- scheduling information for multiple PDSCH and multiple PDSCH in one
- partial scheduling information for at least one PUSCH and/or at least one PDSCH in one carrier/BWP, wherein the partial scheduling information is an update to scheduling information in the first stage DCI;
- partial scheduling information for at least one PUSCH and/or at least one PDSCH, wherein remaining scheduling information for the at least one PUSCH and/or at least one PDSCH is included in the first stage DCI;

configuration information related to an artificial intelligence (AI)/machine learning (ML) function;

configuration information related to a non-AI/ML function;

Therefore, the two-stage DCI mechanism can be used to achieve a unified design for UEs with different AI/ML capabilities. The design is unified in the sense that the same DCI format for the first stage DCI can be used, while the scheduling information in the second stage DCI is flexible, and can be used to configure AI/ML functions. For example, for scheduling information included scheduling information in second stage DCI, which may include one or more of frequency/time domain resource allocation, modulation order, coding scheme, new data indicator, redundancy version, HARQ related information, transmit power control, PUCCH resource indicator, antenna port(s), transmission configuration indication, code block group indicator, preemption indication, cancellation indication, availability indicator, resource pool index, etc. (others could refer to Section 7.3.1 DCI formats in 3GPP TS 38.212-g20), the second stage DCI can include a dynamic indication whether the information is for a non-AI mode or an AI mode. When the AI mode has multiple AI types, the second stage DCI can include a dynamic indication indicating one of the multiple AI type. When an AI mode applies, the value in the scheduling information field is used as an input to an AI inference engine to determine the meaning.

For the time and frequency resources of first stage DCI and second stage DCI, they can be time division multiplexed and/or frequency division multiplexed, however in general, the first stage DCI will need to be decoded before the second stage DCI is decoded, as the UE is not aware of the second stage DCI until the first stage DCI is decoded. FIG. 5A shows a first example, generally indicated at 410 (which shows the same resource usage as FIG. 5A), where first and second stage DCIs 400,402 are time division multiplexed. In some embodiments, where the frequency resource is the same for the first and second stage DCIs, the scheduling information of the second stage DCI contained in the first stage DCI does not include information about a frequency resource.

Figure 5B:
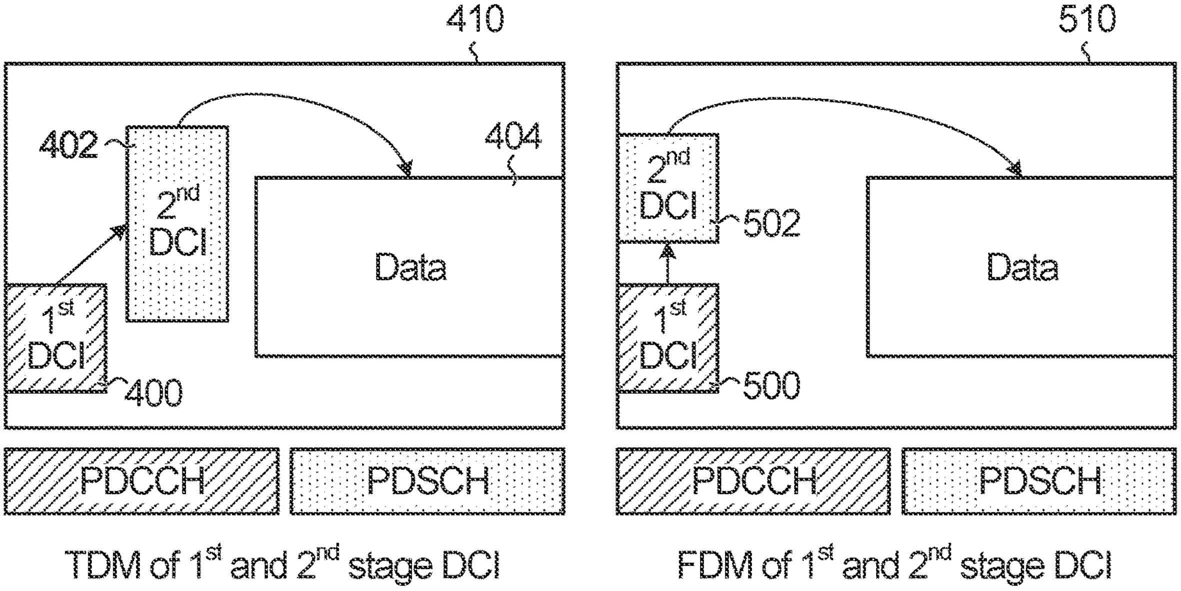
FIG. 5B shows time division multiplexing and frequency division multiplexing for a two stage DCI.

FIG. 5B shows a second example, generally indicated at 510, where first and second stage DCIs 500,502 are frequency division multiplexed. In this example, the first and second stage DCIs 500,502 are received at the same time or in overlapping frequency resources, the first stage DCI 500 is decoded first, since the UE is not aware of the second stage DCI until having decoded the first stage DCI. In some embodiments, where the time resource is the same for the first and second stage DCIs, the scheduling information of the second stage DCI contained in the first stage DCI does not include information about a time resource.

For all of the embodiments described herein, it is assumed that the first stage DCI is carried by a PDCCH and the second stage DCI is carried by a PDSCH. PDCCH is the physical channel that carries control information. PDSCH is the physical channel that carries DL-SCH originating from a higher layer and/or control information. The PDCCH transmission of the first stage DCI may include of one or more control-channel elements (CCEs), or enhanced CCEs. The PDSCH transmission of the second stage DCI may occupy at least one of one or more PRBs in the frequency-domain, one or more TBs and one or more symbols in the time-domain. The processing procedure is similar to the downlink data processing.

Figure 6:
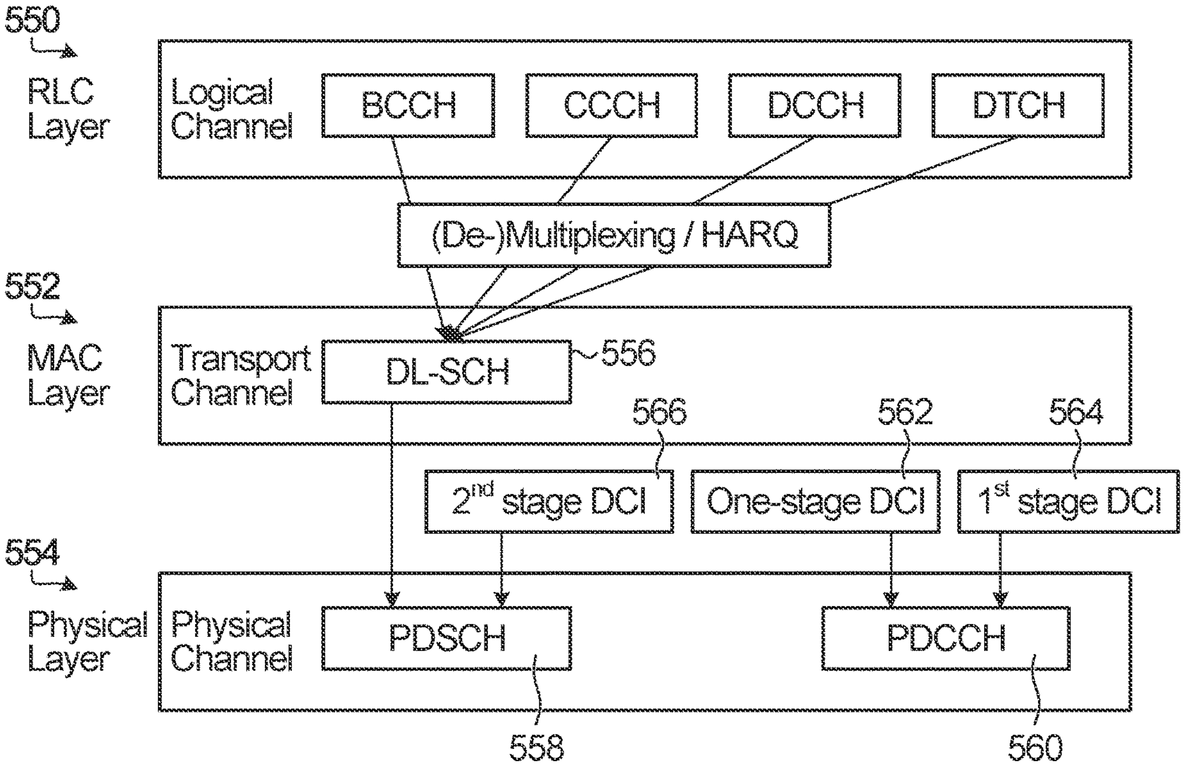
FIG. 6 shows a protocol stack showing how the two stage DCI is transmitted.

Referring now to FIG. 6, shown is an example of a protocol stack that includes RLC (radio link control) layer 550, MAC layer 552 and physical layer 554. RLC operates per logical channel, MAC operates per transport channel (e.g. downlink-shared channel (DL-SCH)) and physical layer operates per physical channel (e.g. PDSCH, PDCCH).

PDSCH 558 is the physical channel that carries the DL-SCH originating from a higher layer, i.e. there is a particular transport channel is mapped to PDSCH. For example, DL-SCH 556 is shown mapped to PDSCH 558.

PDCCH 560 is the physical channel that carries control information, e.g. DCI, and PDCCH has no corresponding transport channel. With the provided methods, one stage DCI 562 and first stage DCI 564 are carried by PDCCH 560, second stage DCI 566 is carried by PDSCH 558, but as noted above there is no multiplexing between the DCI and the downlink data on PDSCH 558. While the PDSCH is generally used to transmit transport blocks including downlink data from a DL-SCH, when a transport block transmitted on the PDSCH is carrying the second stage DCI, the PDSCH does not carry DL-SCH.

Figure 7A:
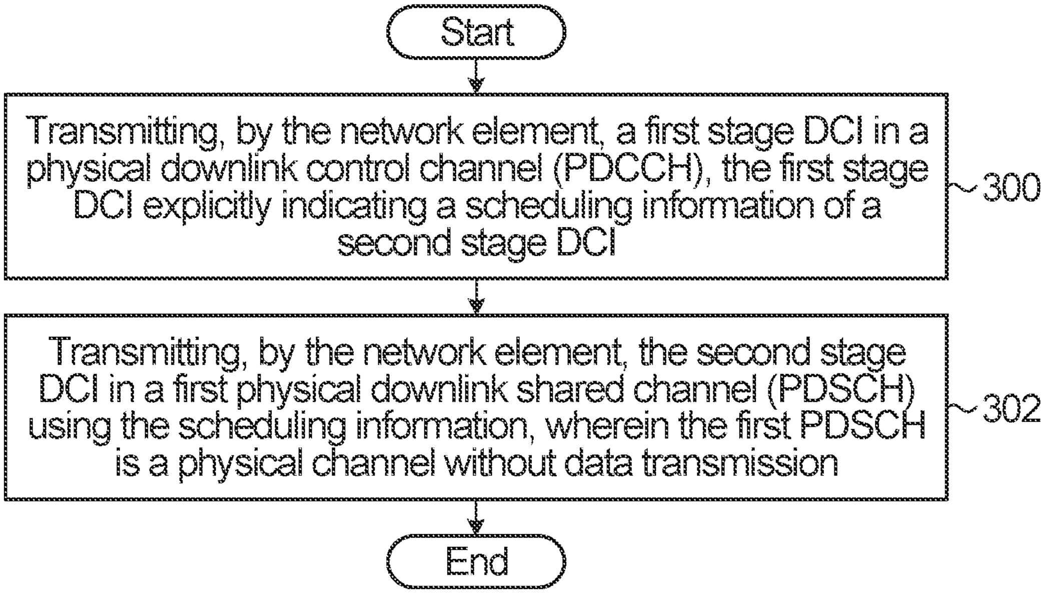
FIG. 7A is a flowchart of a method of two stage DCI transmission.

Combining the above FIGS. 5A and 5B, FIG. 7A is a flowchart of a method of two stage DCI transmission by a network element, e.g based on the two stage DCI structure shown in any one of FIGS. 5A and 5B. The method of FIG. 7A will be described as being performed by a network element having at least one processor, a computer readable storage medium, a transmitter and a receiver. In some implementations, the computer readable storage medium is operatively coupled to the at least one processor and stores programming for execution by the at least one processor. The programming may include instructions to perform the method of FIG. 7A. The method begins in block 300 with transmitting, by the network element, a first stage DCI in a physical downlink control channel (PDCCH), the first stage DCI explicitly indicating a scheduling information of a second stage DCI. The method continues in block 302 with transmitting, by the network element, the second stage DCI in a first physical downlink shared channel (PDSCH), wherein the first PDSCH is a physical channel without data transmission. The first stage DCI is blind decoded by the UE. No blind decoding is required for the second stage DCI because the scheduling information of the second stage DCI is explicitly indicated by the first stage DCI.

Figure 7B:
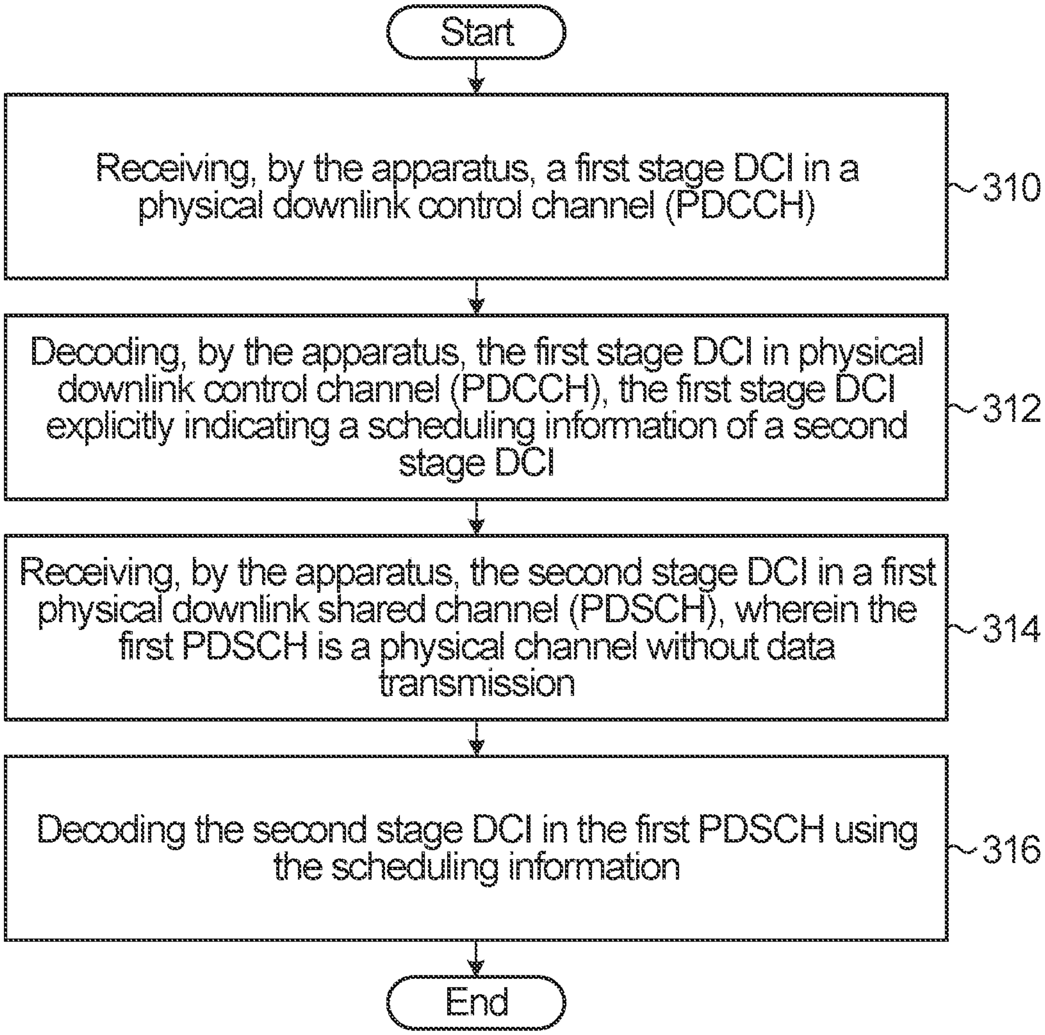
FIG. 7B is a flowchart of a method of two stage DCI reception.

Combining the above FIGS. 5A and 5B, FIG. 7B is a flowchart of a method of two stage DCI reception. The method of FIG. 7B will be described as being performed by an apparatus having at least one processor, a computer readable storage medium, a transmitter and a receiver. In some implementations, the computer readable storage medium is operatively coupled to the at least one processor and stores programming for execution by the at least one processor. The programming may include instructions to perform the method of FIG. 7B. In some implementations, the apparatus is a UE or ED, such as the ED 110 of FIGS. 1 to 3, for example. The method begins in block 310 with receiving, by the apparatus, a first stage DCI in a physical downlink control channel (PDCCH). The method continues in block 312 with decoding, by the apparatus, the first stage DCI in physical downlink control channel (PDCCH), the first stage DCI explicitly indicating a scheduling information of a second stage DCI. The method continues in block 314 with receiving, by the apparatus, the second stage DCI in a first physical downlink shared channel (PDSCH), wherein the first PDSCH is a physical channel without data transmission. The method continues in block 316 with decoding, by the apparatus, the second stage DCI in the first PDSCH.

The first stage DCI is blind decoded by the UE. No blind decoding is required for the second stage DCI because the scheduling information of the second stage DCI is explicitly indicated by the first stage DCI.

Based on the embodiment of in FIGS. 7A and 7B, the PDCCH and PDSCH structure can refer to above FIG. 6. Also the first stage DCI and the second stage DCI can be transmitted in TDM or FDM which disclosed in the above embodiments of FIG. 5A and FIG. 5B. In some embodiments, scheduling information of the second stage DCI indicates parameters of at least one of a time resource, a frequency resource and a spatial resource of the second stage DCI. The first stage DCI may also indicate at least modulation order of the second stage DCI, coding rate of the second stage DCI, partial or full scheduling information for a data transmission. The second stage DCI may include scheduling information for data channel, e.g. PDSCH for DL scheduling and/or PUSCH for uplink (UL) scheduling, for an example, the indication of the time and/or frequency and/or spatial resources and/or modulation order and/or coding rate of the second stage DCI. For another example, the scheduling information for data transmission, e.g. DL scheduling for PDSCH and/or UL scheduling for PUSCH and/or sidelink resources for UE transmission or reception. In some embodiments, the first stage DCI indicates scheduling information of the second stage DCI, and also includes partial scheduling information for a data transmission, such as one or more of time/frequency/spatial resource allocation, modulation order, coding rate, HARQ information, UE feedback resources, or power control for data. The second stage DCI includes additional detailed scheduling information for data, e.g. the information not indicated by first stage DCI, or an update to the information indicated by first stage DCI for data. In some embodiments, the second stage DCI may indicate at least one of the following for scheduling data transmission for a UE: scheduling information for one PDSCH in one carrier/BWP; scheduling information for multiple PDSCH in one carrier/BWP; scheduling information for one PUSCH in one carrier/BWP; scheduling information for multiple PUSCH in one carrier/BWP; scheduling information for one PDSCH and one PUSCH in one carrier/BWP; scheduling information for one PDSCH and multiple PUSCH in one carrier/BWP; scheduling information for multiple PDSCH and one PUSCH in one carrier/BWP; scheduling information for multiple PDSCH and multiple PDSCH in one carrier/BWP; scheduling information for sidelink in one carrier/BWP; partial scheduling information for at least one PUSCH and/or at least one PDSCH in one carrier/BWP, wherein the partial scheduling information is an update to scheduling information in the first stage DCI; partial scheduling information for at least one PUSCH and/or at least one PDSCH, wherein remaining scheduling information for the at least one PUSCH and/or at least one PDSCH is included in the first stage DCI; configuration information related to an artificial intelligence (AI)/machine learning (ML) function; configuration information related to a non-AI/ML function. Advantageously, with the provided approach, there can be a reduction in the number of blind decodings, since only blind decoding for the first stage DCI may need to be performed, blind detection is not needed for the second stage DCI, thus reduce the number of blind decoding. The approach also allows for a flexible DCI size for the second stage DCI, and enables more flexible scheduling, thus not only can achieve forward compatibility (limited/fixed size of first stage DCI), but also can achieve more flexible DCI size for the first stage DCI and the second stage DCI based on different requirements. In addition, in some embodiments, the number of formats and/or the number of sizes of the first stage DCI is limited to a small number and this leads to a small number of blind decodings being needed to recover the first stage DCI.

Scheduling Parameters for PDSCH Carrying Second Stage DCI Vs. Data

Referring to FIGS. 5A, 5B, 6, 7A, 7B, a PDSCH carrying a second stage DCI can be viewed as being more important to the UE as compared to the PDSCH carrying downlink data. In some embodiments, the base station takes one or more steps to improve the robustness of the PDSCH carrying second stage DCI. This can involve, for example, using a lower modulation order, a lower coding rate, or a single layer transmission for the second stage DCI. For the PDSCH carrying downlink data, the BS may schedule with lower reliability requirement to achieve better performance, e.g. high throughput.

In some embodiments the available value(s) of scheduling parameters for scheduling a PDSCH carrying second stage DCI are different from the corresponding values for scheduling a PDSCH carrying downlink data. The available sets of values may be separately predefined or separately configured by the base station. A set of specific examples are detailed below.

Retransmission: There is no retransmission for the PDSCH carrying second stage DCI, so no hybrid automatic repeat request (HARQ) related information is included in first stage DCI (e.g. new data indicator (NDI), redundancy version (RV), HARQ process, downlink allocation index (DAI), HARQ timing, transmit power control (TPC) command for scheduled PUCCH, PUCCH resource indicator). On the other hand, to support retransmission for the PDSCH carrying downlink data, there is HARQ related information in the first stage DCI scheduling the PDSCH.

Modulation order: a fixed or smaller set of modulation orders may be available for PDSCH carrying second stage DCI vs. PDSCH carrying data. In a specific example, for the PDSCH carrying downlink data, available values include {2, 4, 6} or {2, 4, 6, 8}, and for the PDSCH carrying second stage DCI, a predefined modulation order, e.g. 1 or 2 is used, or smaller set (or a subset) than that of the PDSCH carrying downlink data, e.g. {2, 4} or {2, 4, 6}.

Coding rate: For the PDSCH carrying second stage DCI, a smaller set of coding rates may be available compared to the set available for PDSCH carrying downlink data. In some embodiments, the maximum value of the coding rate for the PDSCH carrying second stage DCI is smaller than that for the PDSCH carrying downlink data.

MIMO layer: The maximum value of allowed layers may be smaller for the PDSCH carrying second stage DCI. For example, 1 or 2 layers may be allowed for PDSCH carrying second stage DCI compared to 8 layers for PDSCH carrying downlink data.

Time/Frequency domain resource allocation: the bit length of the field of time/frequency domain resource allocation may be shorter in the DCI scheduling PDSCH carrying second stage DCI than that in the DCI scheduling PDSCH carrying downlink data.

Figure 8:
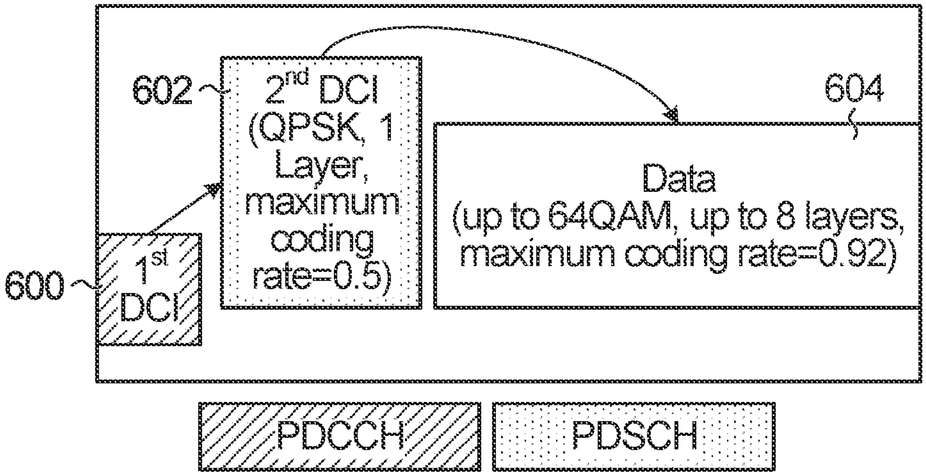
FIG. 8 shows the use of different parameter sets for PDSCH used for second stage DCI vs. downlink data.

An example is shown in FIG. 8, where the first stage DCI 600 schedules the second stage DCI 602 with QPSK, 1 layer, and maximum coding rate and the second stage DCI 602 schedules data 604 with up to 64 QAM, up to 8 layers, and a maximum coding rate of 0.92.

Figure 9A:
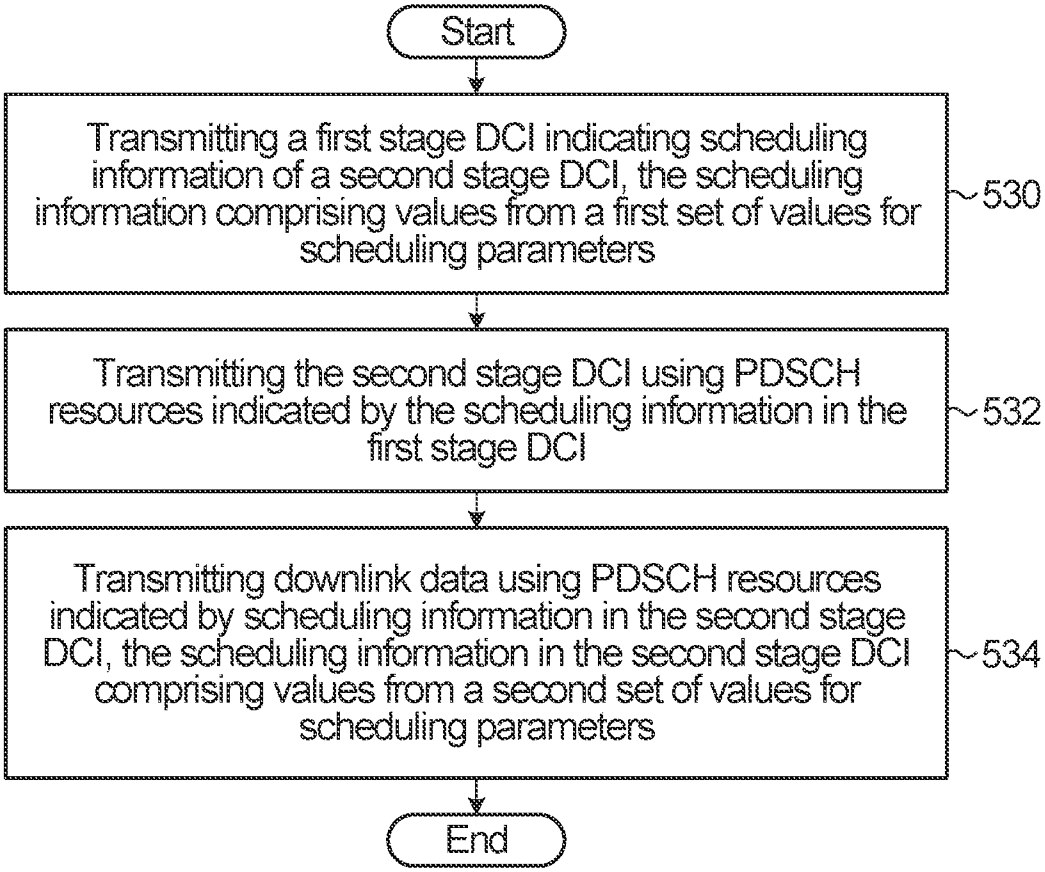
FIGS. 9A and 9B show flowcharts illustrating methods of using different parameter sets for PDSCH used for second stage DCI vs. downlink data.

Referring to FIGS. 5A and 5B, FIG. 9A is a flowchart of a transmitter side method based on the above described embodiments. The method begins in block 530 with transmitting a first stage DCI indicating scheduling information of a second stage DCI, the scheduling information comprising values from a first set of values for scheduling parameters. The method continues in block 532 with transmitting the second stage DCI using PDSCH resources indicated by the scheduling information in the first stage DCI. The method continues in block 534 with transmitting downlink data using PDSCH resources indicated by scheduling information in the second stage DCI, the scheduling information in the second stage DCI comprising values from a second set of values for scheduling parameters.

Figure 9B:
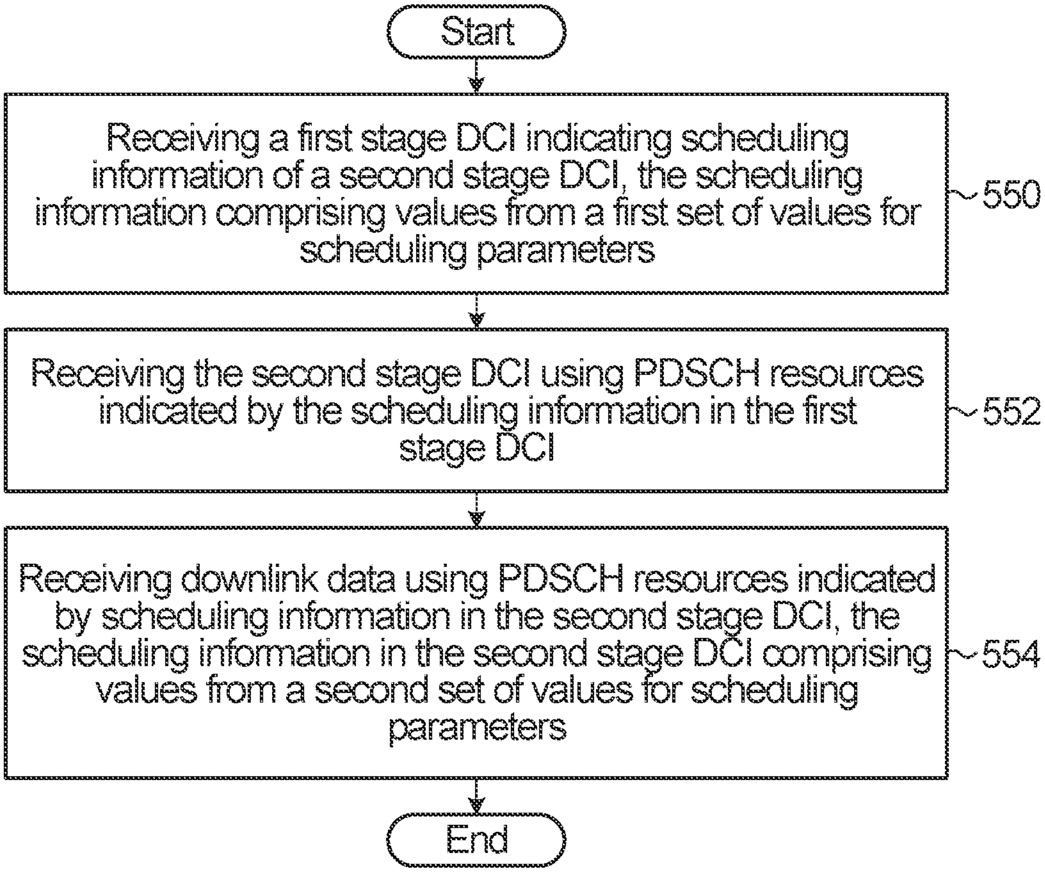

FIG. 9B is a flowchart of a receiver side method based on the above described embodiments. The method begins in block 550 with receiving a first stage DCI in a PDCCH indicating scheduling information of a second stage DCI, the scheduling information comprising values from a first set of values for scheduling parameters. The method continues in block 552 with receiving the second stage DCI using PDSCH resources indicated by the scheduling information in the first stage DCI. The method continues in block 554 with receiving downlink data using PDSCH resources indicated by scheduling information in the second stage DCI, the scheduling information in the second stage DCI comprising values from a second set of values for scheduling parameters. The first/second set of values can be predefined or configured by the network device. For example, modulation order configuration of the first set values may be {2}, modulation order configuration of the second set values may be {2,4,6}

Embodiments of FIGS. 9A and 9B, one option is that the first set of values and the second set of values for indicating one or more of:

- the first set of values and the second set of values are separately predefined or configured for indicating whether retransmission is enabled;
- if retransmission is enabled in the first set of values retransmission related parameters configured in the set of values, retransmission related parameters can be at least one of HARQ related information including at least one of NDI, RV, HARQ process, DAI, HARQ timing, TPC command for scheduled PUCCH, PUCCH resource indicator;
- the first set of values and the second set of values are separately predefined or configured for indicating modulation order options, one option, the first set of values is predefined or configured modulation order, e.g. 1 or 2, the second set of values is configured with any one of {2, 4} or {2, 4, 6} from an available set {2, 4, 6} or {2, 4, 6, 8}. Another option, the first set of values associating with modulation order is configured smaller set or a subset than the second set of values;
- the first set of values and the second set of values are separately predefined or configured for indicating coding rate options, one option, the maximum value of the coding rate configured in the first set of values is smaller than the maximum value of the coding rate configured in the second set of values, e.g, the maximum value of the coding rate configured in the first set of values is 0.5, the maximum value of the coding rate configured in the second set of values is 0.95. Another option, coding rate can be flexible configured based on different requirement;
- the first set of values and the second set of values are separately predefined or configured for indicating options for number of transport block (TB)s; one option, the first set of values associating with number of TB is fixed, e.g one TB, the second set of values associating with number of TB is flexible configured with one or more TBs; Another option, the first set of values and the second set of values associating with number of TB are flexible configured with one or more TBs;
- the first set of values and the second set of values are separately predefined or configured for indicating options for number of MIMO layers; one option, the maximum number of MIMO layers (e. g number 2) configured in the first set of values is smaller than the maximum number of MIMO layers (e. g number 8) configured in the second set of values; another options, number of MIMO layers in the first set of values is predefined with number 1 or 2, number of MIMO layers in the second set of values is configured with any one of 1, 2, 4, 6, 8;
- the first set of values and the second set of values are separately configured for indicating options for time/frequency domain resource allocation types, and/or locations. One option, the bit length of the time/frequency domain resource field associating with the first set of values configured shorter than the bit length of the time/frequency domain resource field associating with the second set of values. Another option, the bit length of the time/frequency domain resource field associating with the first set of values and the bit length of the time/frequency domain resource field associating with the second set of values are flexible configured based on different requirement.

Advantageously, with these embodiments, the first set of values for PDSCH carrying second stage DCI and the second set of values for PDSCH carrying downlink data, the available values of scheduling parameter(s) for scheduling these two PDSCH may be separately predefined or configured by a BS, ensuring the reliability of the second stage DCI and reducing the scheduling overhead in the first stage DCI.

Two-Stage DCI with Carrier Aggregation (CA) or Dual Carrier (DC)

In some embodiments, two stage DCI is used in systems employing CA or DC to reduce the number of UE blind decodings and reduce the scheduling overhead.

In this embodiment, a UE performs recovers a first stage DCI in one carrier, as in other embodiments described above. For example, the UE may monitor primary component carrier (PCC) for a first stage DCI using blind detection. As before, the first stage DCI indicates the scheduling information of the second stage DCI. However, in this embodiment, the second stage DCI could be in the same carrier as the first stage DCI, or in a different carrier (e.g. a secondary component carrier), and the second stage DCI indicates scheduling information for one or multiple carriers. The scheduling information for each carrier could be DL, or UL, or DL and UL or sidelink. The scheduling information for each carrier could be for one transmission or for multiple transmissions (e.g. multiple slot scheduling with same or different TBs for each slot). In some embodiments, the second stage DCI may indicate whether scheduling information is present for a given carrier. In this case, for a given carrier, the second stage DCI includes scheduling information for the carrier when the indication indicates there is scheduling information for the carrier.

Figure 10:
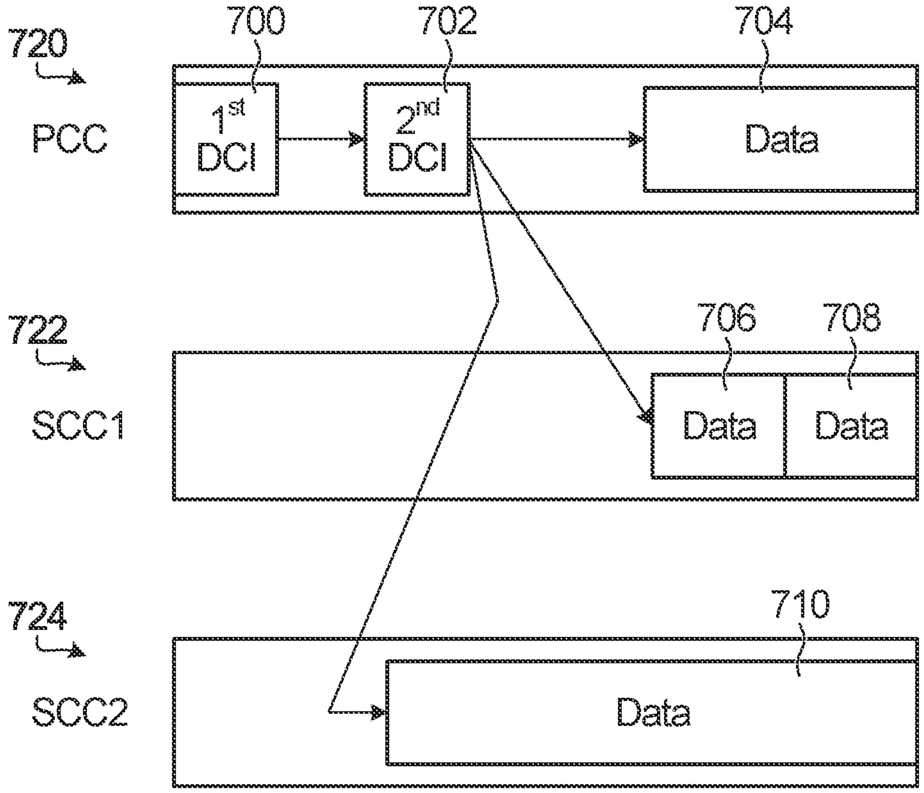
FIG. 10 shows time frequency resources for a two stage DCI applied for scheduling over multiple carriers.

An example is shown in FIG. 10. Shown is a first stage DCI 700 on a PCC 722 and a second stage DCI 702 also on the PCC 722. The first stage DCI 700 includes an indication of the time frequency resources of the second stage DCI 702. While in the example, the second stage DCI is on the same carrier as the first stage DCI, alternatively it could be on a different carrier, and this would be indicated in the first stage DCI. The second stage DCI 702 includes scheduling information for scheduling data transmission 704 communicated on PCC 702, scheduling information for scheduling data transmissions 706,708 communicated on a second carrier SCC1 722, and scheduling information for scheduling data transmission 710 communicated on a third carrier SCC2 724.

The use of the two-stage DCI in this manner can reduce the number of blind decodings for CA/DC. If the number of carriers is increased, the number of blind decodings is not correspondingly increased.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in an apparatus for receiving downlink control information (DCI), the method comprising:

receiving, by the apparatus, a first stage DCI in a physical downlink control channel (PDCCH) in a first carrier;

decoding, by the apparatus, the first stage DCI in the PDCCH in the first carrier, the first stage DCI explicitly indicating a scheduling information of a second stage DCI that is in a second carrier different from the first carrier, the first stage DCI further indicating modulation order of the second stage DCI and coding rate of the second stage DCI and partial or full scheduling information for a data channel transmission;

receiving, by the apparatus, the second stage DCI in a physical downlink shared channel (PDSCH) in the second carrier that is different from the first carrier; and decoding, by the apparatus, the second stage DCI in the PDSCH;

wherein the PDSCH is a physical channel without data transmission.

2. The method of claim 1, wherein the scheduling information of the second stage DCI comprises parameters of at least one of a time domain resource, a frequency domain resource, a spatial domain resource of the second stage DCI.

3. The method of claim 1, wherein the second stage DCI indicates at least one of the following:

scheduling information for one PDSCH;

scheduling information for multiple PDSCH;

scheduling information for one PUSCH (physical uplink shared channel);

scheduling information for multiple PUSCH;

scheduling information for one PDSCH and one PUSCH;

scheduling information for one PDSCH and multiple PUSCH;

scheduling information for multiple PDSCH and one PUSCH;

scheduling information for multiple PDSCH and multiple PUSCH;

scheduling information for sidelink;

partial scheduling information for at least one PUSCH and/or at least one PDSCH, wherein the partial scheduling information is an update to scheduling information in the first stage DCI;

partial scheduling information for at least one PUSCH and/or at least one PDSCH, wherein remaining scheduling information for the at least one PUSCH and/or at least one PDSCH is included in the first stage DCI;

configuration information related to an artificial intelligence (AI)/machine learning (ML) function; and configuration information related to a non-AI/ML function.

4. The method of claim 1, wherein the apparatus receives the first stage DCI and the second stage DCI time division multiplexed or frequency division multiplexed or time division multiplexed and frequency division multiplexed.

5. The method of claim 1, further comprising:

receiving downlink data using PDSCH resources indicated by the scheduling information of the second stage DCI;

wherein the scheduling information indicated in the first stage DCI comprises values from a first set of values for scheduling parameters, the scheduling information in the second stage DCI comprises values from a second set of values for scheduling parameters, and the first set of values and the second set of values are separately predefined or configured for indicating one or more of:

whether retransmission is enabled;

inclusion of retransmission related parameters;

modulation order options;

coding rate options;

options for number of transport blocks;

options for number of MIMO layers;

options for time/frequency domain resource allocation types, and/or locations.

6. The method of claim 1, wherein the second stage DCI comprises scheduling information for multiple carriers.

7. The method of claim 1, wherein the second stage DCI comprises:

an indication of whether there is scheduling information for each of N carriers; and scheduling information for each of N carriers when the indication indicates there is scheduling information for each of N carriers, where N≥2.

8. The method of claim 1, wherein the first carrier is a primary component carrier (PCC) and the second carrier is a secondary component carrier (SCC).

9. A method in a network element for transmitting downlink control information (DCI), the method comprising:

transmitting, by the network element, a first stage DCI in a physical downlink control channel (PDCCH) in a first carrier, the first stage DCI explicitly indicating a scheduling information of a second stage DCI that is in a second carrier different from the first carrier, the first stage DCI further indicating modulation order of the second stage DCI and coding rate of the second stage DCI and partial or full scheduling information for a data channel transmission; and transmitting, by the network element, the second stage DCI in a first physical downlink shared channel (PDSCH) in the second carrier that is different from the first carrier;

wherein the PDSCH is a physical channel without data transmission.

10. The method of claim 9, wherein the scheduling information of the second stage DCI comprises parameters of at least one of a time domain resource, a frequency domain resource, a spatial domain resource of the second stage DCI.

11. The method of claim 9, wherein the second stage DCI indicates at least one of the following:

scheduling information for one PDSCH;

scheduling information for multiple PDSCH;

scheduling information for one PUSCH (physical uplink shared channel);

scheduling information for multiple PUSCH;

scheduling information for one PDSCH and one PUSCH;

scheduling information for one PDSCH and multiple PUSCH;

scheduling information for multiple PDSCH and one PUSCH;

scheduling information for multiple PDSCH and multiple PUSCH;

scheduling information for sidelink;

partial scheduling information for at least one PUSCH and/or at least one PDSCH, wherein the partial scheduling information is an update to scheduling information in the first stage DCI;

partial scheduling information for at least one PUSCH and/or at least one PDSCH, wherein remaining scheduling information for the at least one PUSCH and/or at least one PDSCH is included in the first stage DCI;

configuration information related to an artificial intelligence (AI)/machine learning (ML) function; and configuration information related to a non-AI/ML function.

12. The method of claim 9, wherein the network element transmits the first stage DCI and the second stage DCI time division multiplexed or frequency division multiplexed or time division multiplexed and frequency division multiplexed.

13. The method of claim 9, further comprising:

transmitting downlink data using PDSCH resources indicated by scheduling information in the second stage DCI;

wherein the scheduling information indicated in the first stage DCI comprises values from a first set of values for scheduling parameters, the scheduling information in the second stage DCI comprises values from a second set of values for scheduling parameters, and the first set of values and the second set of values are separately predefined or configured for indicating one or more of:

whether retransmission is enabled;

inclusion of retransmission related parameters;

modulation order options;

coding rate options;

options for number of transport blocks;

options for number of MIMO layers;

options for time/frequency domain resource allocation types, and/or locations.

14. The method of claim 9, wherein the second stage DCI comprises scheduling information for multiple carriers.

15. The method of claim 9, wherein the second stage DCI comprises, for each of N carriers, where N≥2:

an indication of whether there is scheduling information for the carrier; and scheduling information for the carrier when the indication indicates there is scheduling information for the carrier.

16. The method of claim 9, wherein the first carrier is a primary component carrier (PCC) and the second carrier is a secondary component carrier (SCC).

17. An apparatus comprising:

at least one processor; and a computer readable storage medium operatively coupled to the at least one processor, the computer readable storage medium storing programming for execution by the at least one processor, the programming comprising instructions to:

receive a first stage DCI in a physical downlink control channel (PDCCH) in a first carrier;

decode the first stage DCI in the PDCCH in the first carrier, the first stage DCI explicitly indicating a scheduling information of a second stage DCI that is in a second carrier different from the first carrier, the first stage DCI further indicating modulation order of the second stage DCI and coding rate of the second stage DCI and partial or full scheduling information for a data channel transmission;

receive the second stage DCI in a physical downlink shared channel (PDSCH) in the second carrier that is different from the first carrier; and decode the second stage DCI in the PDSCH;

wherein the PDSCH is a physical channel without data transmission.

18. The apparatus of claim 17, wherein the scheduling information of the second stage DCI comprises parameters of at least one of a time domain resource, a frequency domain resource, a spatial domain resource of the second stage DCI.

19. A network element comprising:

at least one processor; and a computer readable storage medium operatively coupled to the at least one processor, the computer readable storage medium storing programming for execution by the at least one processor, the programming comprising instructions to:

transmit a first stage DCI in a physical downlink control channel (PDCCH) in a first carrier, the first stage DCI explicitly indicating a scheduling information of a second stage DCI that is in a second carrier different from the first carrier, the first stage DCI further indicating modulation order of the second stage DCI and coding rate of the second stage DCI and partial or full scheduling information for a data channel transmission; and transmit the second stage DCI in a first physical downlink shared channel (PDSCH) in the second carrier that is different from the first carrier;

wherein the PDSCH is a physical channel without data transmission.

20. The network element of claim 19, wherein the scheduling information of the second stage DCI comprises parameters of at least one of a time domain resource, a frequency domain resource, a spatial domain resource of the second stage DCI.

* * * * *